US007762892B2

(12) United States Patent
Lum et al.

(10) Patent No.: US 7,762,892 B2
(45) Date of Patent: Jul. 27, 2010

(54) MODE-ALTERING KEY FOR A CHARACTER INPUT DEVICE

(75) Inventors: Richard S. Lum, Redmond, WA (US); William Guo, Sammamish, WA (US); Greg Martinez, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 10/434,678

(22) Filed: May 9, 2003

(65) Prior Publication Data
US 2004/0224763 A1 Nov. 11, 2004

(51) Int. Cl.
*A63F 13/00* (2006.01)

(52) U.S. Cl. .............................. 463/37; 463/36; 463/38; 463/46; 463/47

(58) Field of Classification Search ................. 715/529, 715/531; 700/84; 345/156, 172, 467, 171, 345/125, 160–170; 455/566; 463/36–37; 708/145, 146; 341/20
See application file for complete search history.

(56) References Cited

U.S. PATENT DOCUMENTS

| | | | | |
|---|---|---|---|---|
| 5,865,546 | A * | 2/1999 | Ganthier et al. | 400/489 |
| 5,874,906 | A | 2/1999 | Willner et al. | |
| 5,984,548 | A | 11/1999 | Willner et al. | |
| 6,043,761 | A | 3/2000 | Burrell, IV | |
| 6,081,207 | A * | 6/2000 | Batio | 341/20 |
| 6,288,709 | B1 | 9/2001 | Willner et al. | |
| 6,317,061 | B1 * | 11/2001 | Batra et al. | 341/22 |
| 6,320,519 | B1 * | 11/2001 | Hsu et al. | 341/23 |
| 6,326,953 | B1 * | 12/2001 | Wana | 345/168 |
| 6,512,511 | B2 | 1/2003 | Willner et al. | |
| 6,574,517 | B1 * | 6/2003 | Park et al. | 700/84 |
| 6,671,170 | B2 * | 12/2003 | Webb et al. | 361/680 |
| 2002/0156615 | A1 * | 10/2002 | Takatsuka et al. | 704/1 |

FOREIGN PATENT DOCUMENTS

| | | |
|---|---|---|
| JP | 02235127 | 9/1990 |
| JP | 03-057010 A | 3/1991 |
| WO | WO 99/65212 | 12/1999 |

OTHER PUBLICATIONS

TI 89 TI 92 Plus Guidebook copyright 1999—2002, preface pages and pp. 16, 18-22.*
"Variable-Length Case Shift and Alternate Mode Selection Using Single Shift Key" IBM Technical Disclosure Bulletin NN84056582, May 1, 1984.*
Decent II game manual release circa 1996 by Parallax Software.*

(Continued)

*Primary Examiner*—Ronald Laneau
*Assistant Examiner*—Ross A. Williams
(74) *Attorney, Agent, or Firm*—Woodcock Washburn LLP

(57) ABSTRACT

A character input device is disclosed that includes a plurality of character input keys and one or more mode-altering keys. Each character input key is associated with multiple characters. By activating only the character input keys, primary characters may be input. By activating the character input keys in conjunction with the mode-altering keys, however, various secondary, tertiary, and quaternary characters may be input. The mode-altering keys may be utilized in a temporary mode, wherein only one secondary, tertiary, or quaternary character is input. Alternately, the mode-altering keys may be utilized in a base mode, wherein a series of secondary, tertiary, or quaternary character is input.

20 Claims, 8 Drawing Sheets

OTHER PUBLICATIONS

ASCII Keyboard Controller, written by Billy Berghammer, posted on Oct. 11, 2002 retrieved on Jan. 30, 1999 at http://www.nintendoworldreport.com/reviewArt.cfm?artid=3970.*

ASCII Keyboard Controller Pictures retrieved at http://www.nintendoworldreport.com/hardArt.cfm?artid=2389.*

"Reviews: ASCII Keyboard Controller;" Internet article printed from <http://www.planetgamecube.com/reviews.cfm?action=hwprofile&id=205>; date of first publication unknown, but believed prior to May 9, 2003.

"AlphaGrip" web page <http://www.alphagrip.com>; date of first publication unknown, but believed to be prior to May 9, 2003.

Office Action dated Oct. 2, 2009 from related JP application No. 2004-116086.

* cited by examiner

| CHARACTER KEY | 1ST MODE (DEFAULT) | 2ND MODE (BLACK) | 3RD MODE (BLUE) | 4TH MODE (GREEN) |
|---|---|---|---|---|
| A | a | A | / | \ |
| B | b | B | " | |
| C | c | C | | |
| D | d | D | # | > |
| E | e | E | 3 | |
| F | f | F | $ | { |
| G | g | G | % | } |
| H | h | H | _ | - |
| I | i | I | 8 | |
| J | j | J | & | - |
| K | k | K | ( | [ |
| L | l | L | ) | ] |
| M | m | M | ; | |
| N | n | N | : | |
| O | o | O | 9 | |
| P | p | P | 0 | |
| Q | q | Q | 1 | |
| R | r | R | 4 | |
| S | s | S | @ | < |
| T | t | T | 5 | |
| U | u | U | 7 | |
| V | v | V | ' | |
| W | w | W | 2 | |
| X | x | X | = | |
| Y | y | Y | 6 | |
| Z | z | Z | + | ^ |
| , | , | , | ! | |
| . | . | . | ? | |

FIGURE 8

MODE-ALTERING KEY FOR A CHARACTER INPUT DEVICE

BACKGROUND OF THE INVENTION

1. Field of the Invention

The present invention relates to devices for character input in computer-related systems. The invention concerns, more particularly, a character input device having at least one mode-altering key that associates specific keys of the character input device with various characters. The invention has application to various peripheral input devices for computers and gaming systems.

2. Description of Background Art

Game controllers are frequently used with gaming and computer systems, for example. Controllers are normally designed to be hand-held, and commonly include a wide variety of user interaction mechanisms such as thumbsticks, D-pads, and various depressible buttons. Due to progressions in video game systems and data transfer capability, some games permit the input of text and other characters. Such text input is commonly performed on a typical, full size keyboard due to the quantity and number of keys used for inputting text.

Attempts have been made to integrate push buttons corresponding to alphabetic keys onto a hand-held game controller. However, such attempts have been less than satisfactory, as the size, number, and/or configuration of the keys and/or the methods of using the keys have not provided a solution that permits for efficient entry of a large number of letters and other characters without drawbacks.

Additionally, other types of reduced-sized devices have provided a large set of reduced sized key buttons permitting entry of letters and other characters. Such devices have been used for wireless transmission and retrieval or emails. These devices commonly include an LCD display region. However, these devices suffer from many of the drawbacks present in the reduced-size keyboard regions of the controllers described above.

SUMMARY OF THE INVENTION

The present invention is a character input device for a computing system that permits a user to enter characters that may be utilized to communicate with other players, for example. The character input device includes a housing, a plurality of character input keys, a first mode-altering key, and a second mode-altering key. The housing forms at least a portion of an outer surface of the character input device, and the character input keys are accessible from an exterior of the housing.

At least one of the character input keys is associated with a primary character, a secondary character, and a tertiary character. The first mode-altering key and the second mode-altering key are accessible from the exterior of the housing. A controller transmits (1) a primary signal associated with the primary character when the at least one of the character input keys is activated and neither the first mode-altering key nor the second mode-altering key activated; (2) a secondary signal associated with the secondary character when the first mode-altering key is activated and the at least one of the character input keys is subsequently activated; and (3) a tertiary signal associated with the tertiary character when the second mode-altering key is activated and the at least one of the character input keys is subsequently activated.

Another aspect of the invention involves a method of character input for a computing device with a character input device. The character input device has at least one mode-altering key, and a plurality of character keys each configured to cause the input of one of a number of characters based on a value of a mode. The method includes changing the mode from a first mode to a second mode upon a single input of a mode-altering key for a single input of an immediately subsequent character key entry, and the method includes automatically changing the mode back from the second mode to the first mode following the entry of the immediately subsequent character key entry.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 8 is a chart indicating the characters entered in view of the character keys actuated based on the mode value.

DETAILED DESCRIPTION OF THE INVENTION

Introduction

The following discussion and accompanying figures disclose a character input device having at least one mode-altering key that associated specific keys of the character input device with various characters. The character input device and, more specifically, the operation of the character input device are disclosed with reference to a gaming system. The present invention, however, has application to a wide variety of products where character input is utilized, including personal computer systems, hand-held electronic devices such as personal data assistants, and cellular telephones, for example. Accordingly, one skilled in the relevant art will recognize that the present invention may be applied to a variety of products, in addition to the specific applications related to gaming systems disclosed herein.

Exemplary Gaming System

Figure 1:
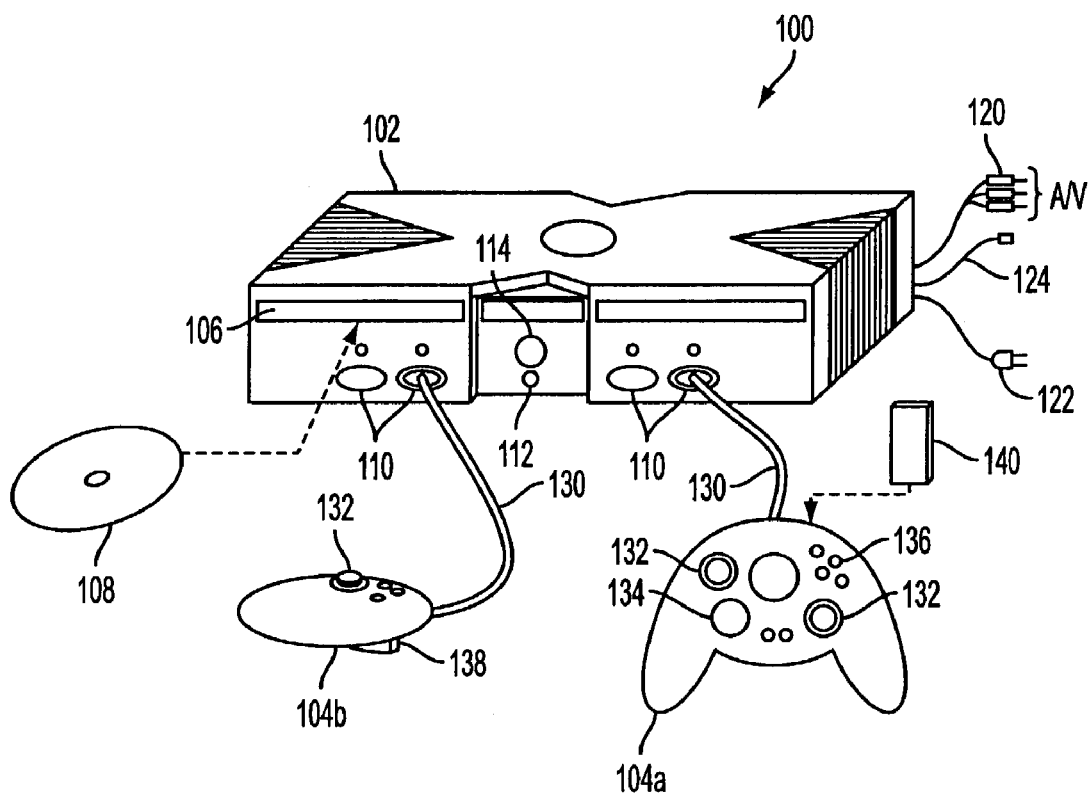
FIG. 1 is a perspective view of an exemplary gaming system.

Various aspects of the present invention may be implemented in connection with gaming systems, as discussed above. Accordingly, an enhanced understanding of the invention may be gained by briefly discussing the components and operation of an exemplary gaming system 100, as depicted in FIG. 1, on which various embodiments of the invention may be employed. The gaming system 100 includes a game console 102 and up to four controllers, as represented by controllers 104a and 104b. The game console 102 is equipped with an internal hard disk drive and a portable media drive 106 that supports various forms of portable storage media 108 as represented by an optical storage disc. Examples of suitable portable storage media 108 include DVD, CD-ROM, game discs, and so forth.

The game console 102 has four slots 110 on its front face to support up to four controllers 104a and 104b, although the number and arrangement of slots may be modified. A power button 112 and an eject button 114 are also positioned on the front face of the game console 102. The power button 112 switches power to the game console, and the eject button 114 alternately opens and closes a tray of the portable media drive 106 to allow insertion and extraction of the portable storage media 108.

The game console 102 connects to a television or other display via A/V interfacing cables 120. A power cable 122 provides power to the game console. The game console 102 may further be configured with broadband capabilities, as represented by the cable or modem connector 124 to facilitate access to a network, such as the Internet.

Each controller 104a and 104b is coupled to the game console 102 via a wire or wireless interface. In the illustrated implementation, the controllers are USB (Universal Serial Bus) compatible and are connected to the console 102 via serial cables 130. The controllers 104a and 104b may be equipped with any of a wide variety of user interaction mechanisms. As illustrated in FIG. 1, controller 104a is equipped with two thumbsticks 132, a D-pad 134, and a variety of buttons 136. Controller 104b includes one thumbstick 132, button 136, and a trigger 138. These mechanisms are merely representative, and other known interaction mechanisms may be substituted for or added to those shown in FIG. 1.

A memory unit 140 may be inserted into either of the controllers 104a or 104b or into the game console 102 to provide additional and portable storage. A portable memory unit 104 enables users to store game parameters and port them for play on other consoles that are similar to console 102. For example, a user may save a game to memory unit 140 using the game console 102 then use that saved game data with a game executed on a different game console. In the described implementation, each controller is configured to accommodate two memory units 140, although more or less than two units may be employed in other implementations. A particular game console 102 may be configured to accommodate any number of memory units 140.

The gaming system 100 is capable of playing, for example, games, music, and videos. With the different storage offerings, titles can be played from the hard disk drive or the portable storage media 108 in portable media drive 106, from an online source, or from a memory unit 140. Examples of media that the gaming system 100 is capable of operating include: (1) Game titles played from CD and DVD discs, from the hard disk drive, or from an online source; (2) Digital music played from a CD in the portable media drive 106, from a file on the hard disk drive (e.g., WINDOWS MEDIA Audio (WMA) format), or from online streaming sources; and (3) Digital audio/video played from a DVD disc in the portable media drive 106, from a file on the hard disk drive (e.g., Active Streaming Format), or from online streaming sources.

Figure 2:
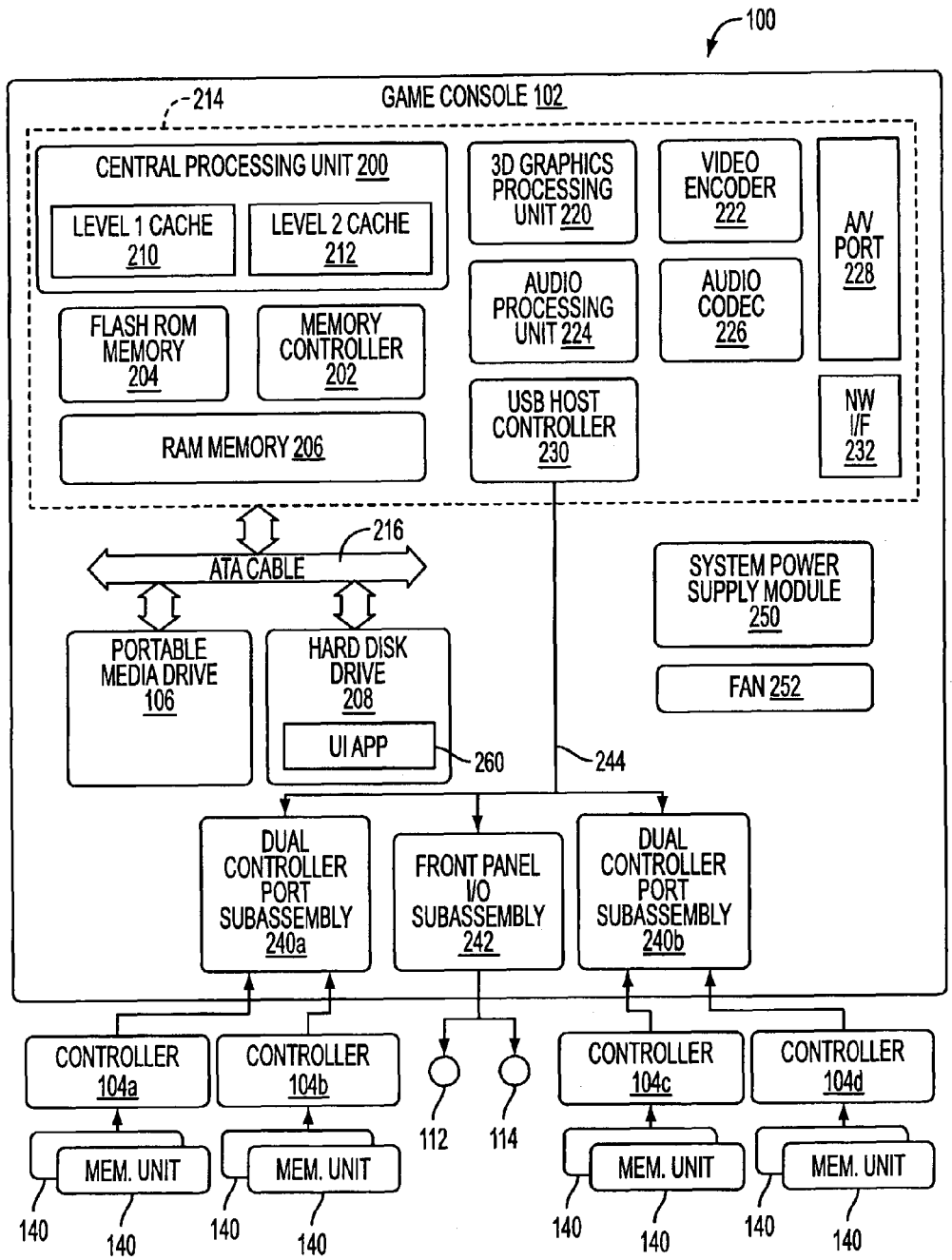
FIG. 2 is a block diagram of the gaming system.

FIG. 2 depicts functional components of the gaming system 100 in further detail. The game console 102 has a CPU (central processing unit) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and, therefore, reduce the number of memory access cycles to improve processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not depicted). The hard disk drive 208 and portable media drive 106 are connected to the memory controller 202 via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not depicted). An audio processing unit 224 and an audio codec (coder/decoder) 226 form a corresponding audio processing pipeline with high fidelity and stereo processing. Audio data is carried between the audio processing unit 224 and the audio codec 226 via a communication link (not depicted). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the controllers 104a and 104b and additional controllers 104c and 104d. The network interface 232 provides access to a network (e.g., the Internet, home network, etc.) and may be any of a wide variety of various wired or wireless interface components including an Ethernet card; a modem, a Bluetooth module, a cable modem, and the like.

The game console 102 has two dual controller support subassemblies 240a and 240b, with each subassembly supporting two of the controllers 104a-104d. A front panel I/O subassembly 242 supports the functionality of the power button 112 and the eject button 114, as well as any LEDs (light emitting diodes) or other indicators exposed on the outer surface of the game console. The subassemblies 240a, 240b, and 242 are coupled to the module 214 via one or more cable assemblies 244.

Eight memory units 140 are illustrated as being connectable to the four controllers 104a-104d (i.e., two memory units for each controller). Each memory unit 140 offers additional storage on which games, game parameters, and other data may be stored. When inserted into a controller, the memory unit 140 can be accessed by the memory controller 202. Additionally, one or more memory units 140 may be inserted into game console 102 and accessed by the memory controller 202. A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types-game data, audio data, and video data-regardless of the media type inserted into the portable media drive 106. To implement the uniform media portal model, a console user interface (UI) application 260 is stored on the hard disk drive 208. When the game console is powered on, various portions of the console application 260 are loaded into RAM 206 and/or caches 210 and 212 and executed on the CPU 200. The console application 260 presents a graphical user interface that provides a consistent user experience when navigating to different media types available on the game console. Thus, the hard disk drive 208 (and the data stored thereon) is an important part of the initialization process. If the hard disk drive 208 is not functioning properly, the gaming system 100 may not boot successfully.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community.

Figure 3:
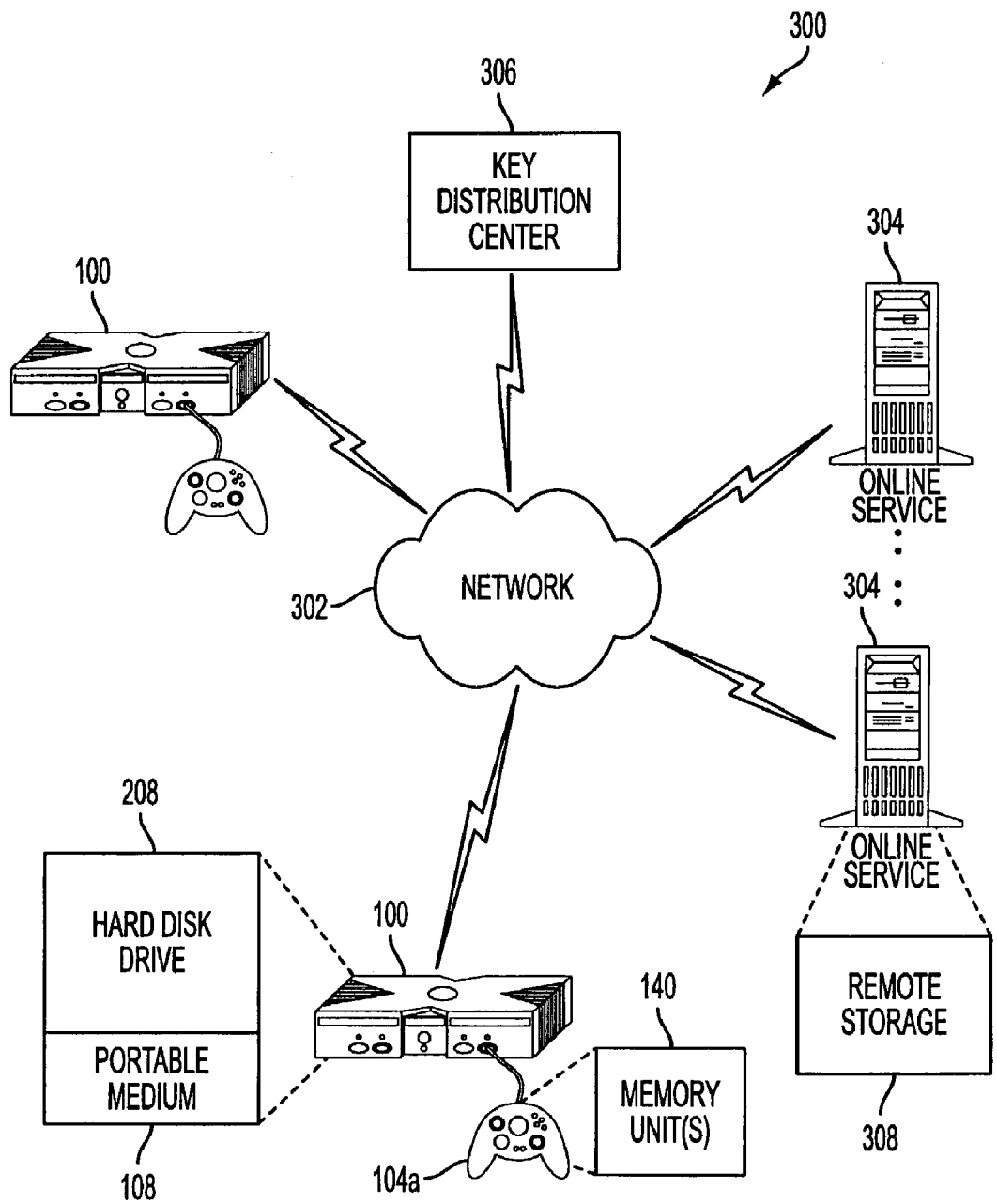
FIG. 3 is a schematic view of a network that incorporates the gaming system.

FIG. 3 depicts an exemplary network gaming environment 300 that interconnects multiple gaming systems 100 via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304 may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100, online storage. In addition to the portable storage media 108, the hard disk drive 208, and the memory units 140, the gaming system 100 may also access data files available at remote storage locations via the network 302, as exemplified by remote storage 308 at online service 304.

Input Device

Figure 4:
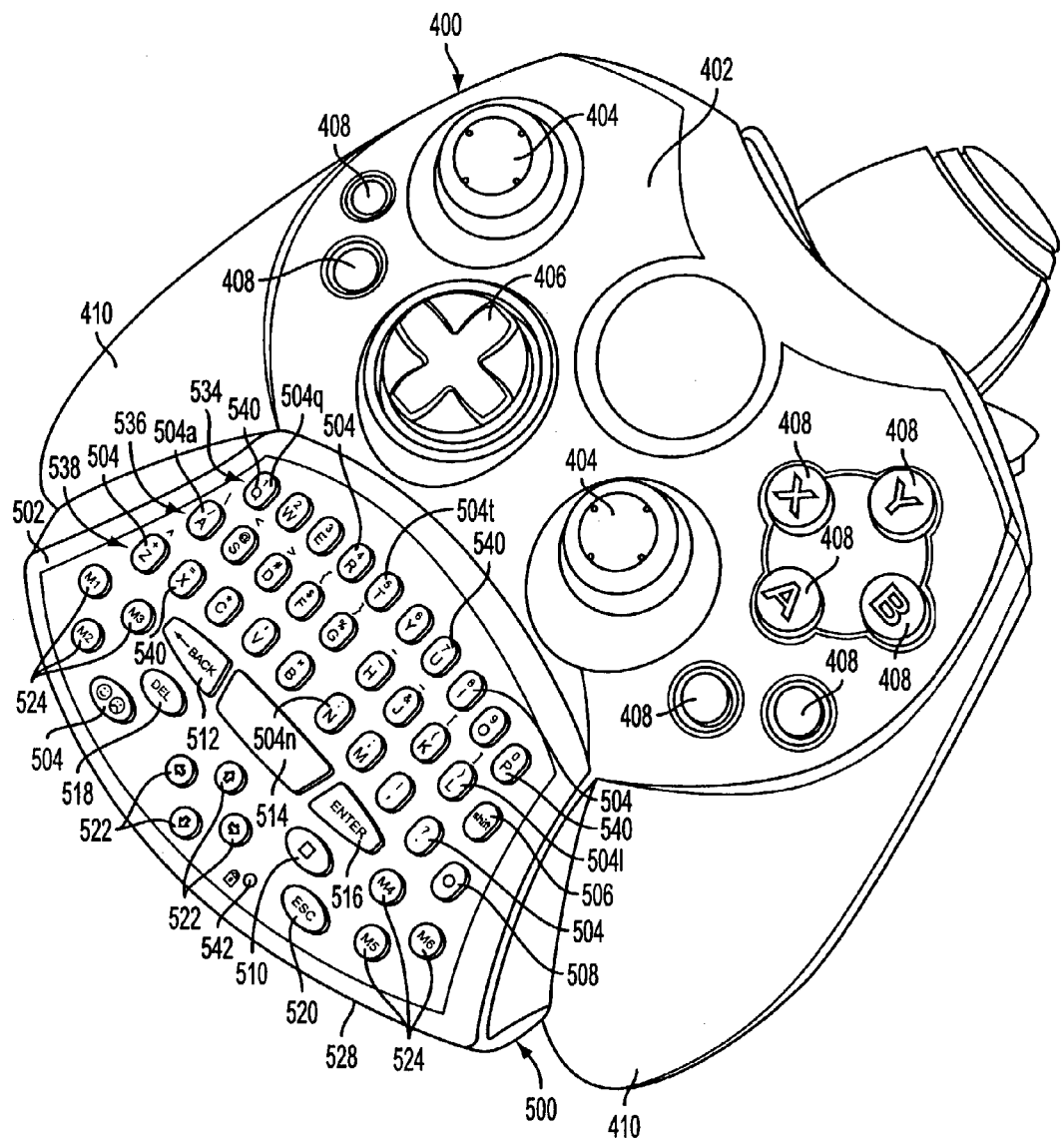
FIG. 4 is a perspective view of an input device having a game controller portion and a character input portion in accordance with the present invention.
Figure 5:
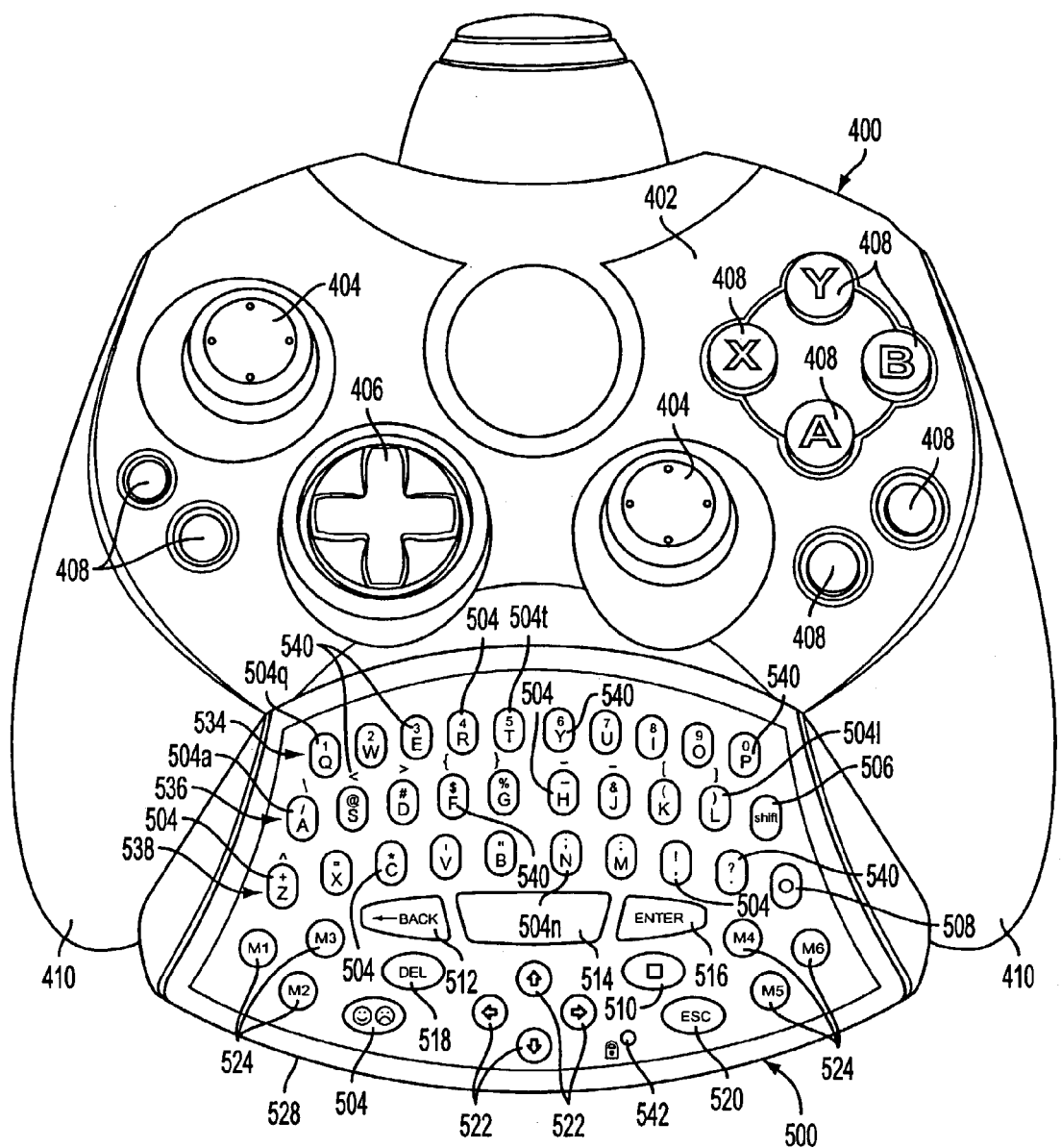
FIG. 5 is a top plan view of the input device.

An input device that is a combination of a game controller portion 400 and a character input portion 500 is disclosed in FIGS. 4 and 5. Within the scope of the present invention, the term "input device" is defined as any implement that transmits a signal to a computer device, such as the game console 102, in response to user interaction with the input device. The game controller portion 400 includes a plurality of interaction mechanisms that are operated by a user to direct game play. Similarly, the character input portion 500 includes a plurality of interaction mechanisms that are operated by the user to input various characters. Accordingly, the game controller portion 400 and the character input portion 500 each transmit signals to the game console 102 based upon user interaction and may be considered an input device individually or in combination.

The various features of the game controller portion 400 and the operation of the game controller portion 400 are well-known in the art and will not be discussed at length here. In general, however, the game controller portion 400 has the configuration and function of the controllers 104a-104d discussed above. Accordingly, the game controller portion 400 may be coupled to the game console 102 via a wire or wireless interface. The game controller portion 400 may also be USB compatible, thereby connecting to the game console 102 via a serial cable. A housing 402 forms a majority of an exterior surface of the game controller portion 400 and is shaped to interface with hands of a user. A variety of user interaction mechanisms protrude from housing 402 and include two thumbsticks 404, a D-pad 406, and a variety of buttons 408. A pair of triggers may also be positioned under a pair of grips 410, which are formed from the housing 402 and provide an area for grasping the game controller portion 400 during use. The game controller portion 400 also includes a pair of slots (not depicted) that may each receive one of the memory units 140 to provide additional and portable storage. The game controller portion 400 may be configured, however, to accommodate any number of the memory units 140. The structure of the game controller portion 400 and the various interaction mechanisms described herein are merely representative, and other structures or interaction mechanisms may be substituted for or added to those shown in the FIGS. 4 and 5.

Figure 6:
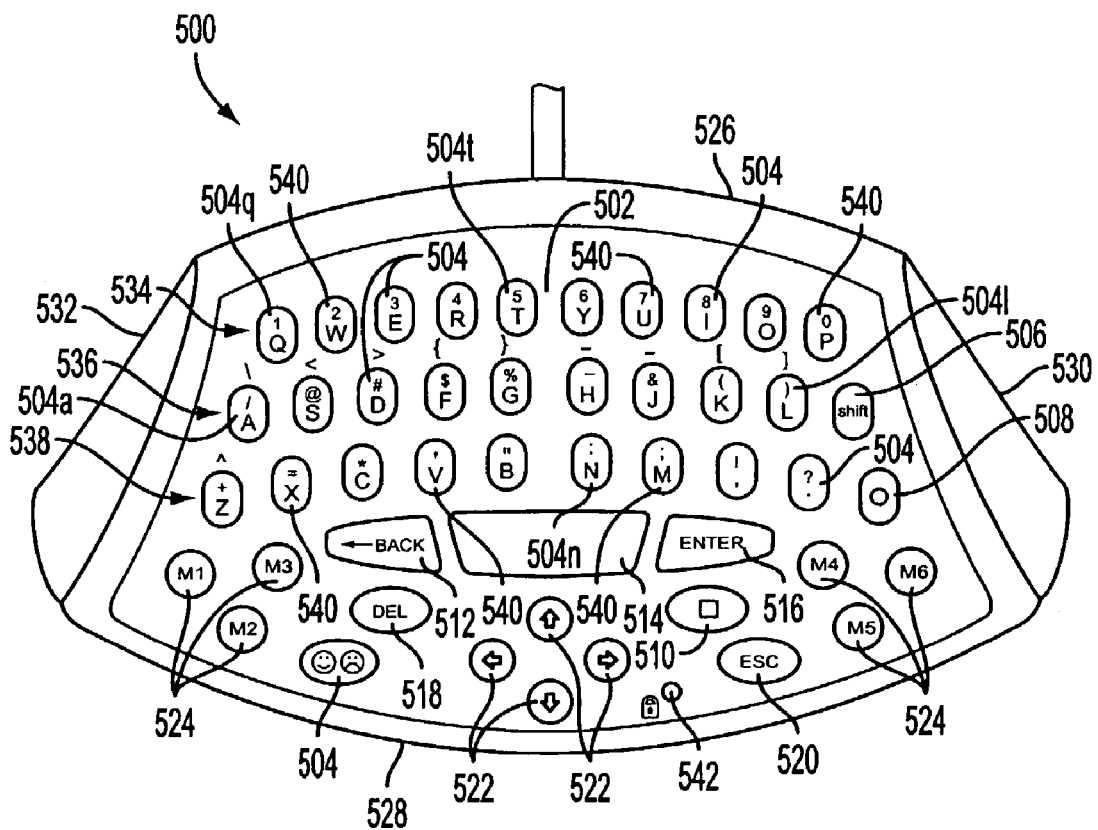
FIG. 6 is a top plan view of the character input portion.

The character input portion 500, depicted in isolation in FIG. 6, is detachably-secured to the game controller portion 400 and may be utilized to enter various characters during game play. The characters may be utilized to provide identifiers for various players, or to facilitate communication among the various players, for example. The term character, as utilized herein, is intended to encompass a symbol or other figure that may be entered by the individual with the character input portion 500. Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written or printed text, such as $, #, %, &, or @, for example. In addition, a character may be one of the various symbols utilized in Asian languages, such as the Chinese, Japanese, and Korean languages. The various characters may also include various images, such as a smiling face or a frowning face.

The character input portion 500 interfaces mechanically and electrically with the game controller portion 400. With regard to the mechanical interface, the character input portion 500 includes a housing 502 that is shaped to abut the housing 402 between the grips 410. An arm (not depicted) or other connection device that detachably-connects to both the game controller portion 400 and the character input portion 500 may extend under both components to secure the components together. Such a mechanical interface permits the character input portion 500 to be detached from the game controller portion 400 when not in use. Regarding the electrical interface, the character input portion 500 may include a connector that electrically-joins with one of the slots in the game controller portion 400 that receive the memory units 140. The electrical connection is preferably created via a USB connection. Within the scope of the present invention, the character input portion 500 may interface mechanically and electrically with the game controller portion 400 through a plurality of other mechanisms. For example, magnetic connectors or other mechanical connection devices may be utilized to detachably-secure the character input portion 500 to the game controller portion 400. Furthermore, a wireless connection may be utilized to form the electrical interface between the character input portion 500 to the game controller portion 400. As an alternate structure, the character input portion 500 may also electrically interface directly with the game console 102.

When the user holds the input device, which includes the game controller portion 400 and the character input portion 500, in both hands, the palms of the hands are in full contact with the grips 410 and the thumbs or other fingers may extend over the character input portion 500. In this position, the distance by which the palms are separated may be approximately 7.5 inches or less, or may be between 5.63 and 6.38 inches, for example. The character input portion 500 extends between the grips 410. Accordingly, the character input portion 500 has a width dimension that is less than the distance by which the palms are separated, and the width dimension is substantially less than the width of a conventional keyboard, for example.

A plurality of keys associated with the character input portion 500 are accessible by the user while operating the character input portion 500. The keys may have a depressible structure, for example, that protrudes through an upper surface of the housing 502. Alternately, the keys may be touch-sensitive. In an exemplary arrangement, all depicted keys are physically non-locking and are activated by a physical force applied downward on the top surface of the keys, and the keys are preferably biased to return to their original position when the force is removed. The keys are preferably spaced from one another such that a portion of the upper surface of the housing 502 extends between adjacent keys. The various keys include a plurality of character input keys 504, a first mode-altering key 506, a second mode-altering key 508, a third mode-altering key 510, a backspace key 512, a space key 514, an enter key 516, a delete key 518, an escape key 520, four arrow keys 522, and six modifiable keys 524.

For reference purposes, the character input portion 500 has a back edge 526 distal from the user during normal use, and a front edge 528 adjacent the user during normal use. Accordingly, an object is said herein to be "behind" another object when it is between that object and the back edge 526. An object is said herein to be "in front of" another object when it is between that object and the front edge 528. Further, the character input portion 500 also has a right edge 530 and a left edge 532. The direction. "lateral" defines the general directions from the right edge 530 to the left edge 532, and from the left edge 532 to the right edge 530.

The character input keys 504 are generally arranged in three rows 534, 536, and 538 that extend generally in the lateral direction. In the depicted embodiment, as can be seen in FIGS. 4-6, the first row 534 includes ten of the character input keys 504 and is positioned in front of the back edge 526 and behind the second row 536. The second row 536 includes nine of the character input keys 504 and is positioned in front of the first row 534 and behind the third row 538. Similarly, the third row 538 includes nine of the character input keys 504 and is positioned in front of the second row 536 and behind the backspace key 512, the space key 514, and the enter key 516. In addition, one character input key 504 is positioned adjacent and behind the front edge 528.

The character input keys 504 are configured such that they are capable of generating multiple distinct characters based upon the current "mode". The mode-altering keys 506, 508, and 510 are designed to alter or otherwise set the mode. For example, in the exemplary embodiment, as shown, there are four possible mode values and each character input key 504 provides for up to four distinct characters based on the mode value. FIG. 8 shows a character lookup chart 800. The chart 800 illustrates the character that is entered based on the specific character input key 504 that is activated and the value of the current mode. This chart 800 may be stored in memory within the character input portion 500, or the chart 800 may be stored in memory of the game console 102 or other computing device.

Based upon the above discussion and the figures, the character input portion 500 includes twenty-nine character input keys 504. For ease of explanation, the following description is provided with representative selected character input keys 504q, 504t, 504a, 504l, and 504n. The character input key 504q is positioned in the first row 534 and adjacent the left edge 532. The character input key 504t is also positioned in the first row 534 and is centrally located with respect to the right edge 530 and the left edge 532. The character input key 504a is positioned in the second row 536, adjacent the left edge 532, and generally in front of the character input key 504q. The character input key 504l is positioned in a right area of the second row 536 and adjacent to the first mode-altering key 506. Finally, the character input key 504n is positioned in a central area of the third row 538 and behind the space key 514.

Various character identifiers 540 (i.e., indicia) are printed on the character input keys 504 and/or on the housing 502. For example, the character input key 504q has two character identifiers 540 printed thereon, which include the alphabetic character "Q" and the numeric character "1". The character input key 504t also has two character identifiers 540 printed thereon, which include a "T" and a "5". In contrast with the character input keys 504q and 504t, the character input key 504a is associated with three character identifiers 540. More particularly, the character input key 504a has two character identifiers 540 printed thereon, which include an "A" and a "/", and a "\" is printed on the housing 502 and in front of the character input key 504a. Similarly, the character input key 504l is associated with three character identifiers 540 that include an "L", ")", and "]", and the character input key 504n is associated with two character identifiers 540 that include an "N" and a ":".

As seen from FIGS. 4-6 and 8, many of the character input keys 504 are associated with alphabetic characters and have a corresponding character identifier 540 printed thereon. The two character input keys 504 positioned on a right side of the third row 538, however, are not associated with alphabetic characters and include character identifiers related to various punctuation marks. Similarly, the character input key 504 positioned adjacent and behind the front edge 528 includes character identifiers 540 corresponding with a smiling face and a frowning face.

The first mode-altering key 506 is positioned in the second row 536 and adjacent to the right edge 530. Similarly, the second mode-altering key 508 is positioned in the third row 538 and adjacent to the right edge 530. Whereas the indicia "shift" is printed on a top surface of the first mode-altering key 506, the top surface of the second mode altering key 508 includes a circular indicia. The third mode-altering key 510 is positioned in front of the enter key 516 and includes a square indicia printed on the top surface. The various indicia on the mode-altering keys 506, 508, and 510 (i.e., "shift", circular, and square) are present such that an individual with color-blindness, for example, will be capable of distinguishing between the mode-altering keys 506, 508, and 510.

In addition, or in lieu of, coding the keys by words and/or shapes, the mode-altering keys 506, 508, and 510 may also be color-coded to correspond with the various character identifiers 540. For example, the "shift" indicia on the first mode-altering key 506 may have a black color that corresponds with the color of the various alphabetic character identifiers 540 on many of the character input keys 504. The circular indicia on the second mode-altering key 508 may have a blue color that corresponds with the color of the various character identifiers 540 on many of the character input keys 504 and forward of the black character identifiers 540. Similarly, the third mode-altering key 510 may have a green color that corresponds with the color of the various character identifiers 540 located on the housing 502 and adjacent to some of the character input keys 504. As will be described in greater detail below, the mode-altering keys 506, 508, and 510 may be utilized in combination with the character input keys 504 such that each of the character input keys 504 may be utilized to input a specific one of multiple possible characters. The black, blue, and green coloring of the mode-altering keys 506, 508, and 510 and the corresponding black, blue, and green coloring of the character identifiers 540, assist in alerting the user as to the relationships between the mode-altering keys 506, 508, and 510 and the specific character that will be input upon activating one of the character input keys 504.

When one of character input keys 504 is activated, a signal is transmitted to the game console 102. In response to receiving the signal, the game console 102 may, for example, render a character on an output device, such as a television or other display. The game console 102 may also transmit a corresponding signal over the network 302 and to one of another game console 102 or one of the online services 304. As will be described in greater detail below, the mode-altering keys 506, 508, and 510 are utilized to modify the character that is input in response to actuating one of the character input keys 504. For example, activating the character input key 504q when the mode is in default will transmit a signal indicative of the character "q", which is a lowercase alphabetic character, to the game console or other computing device. Through use of the first mode-altering key 506, however, activating the character input key 504q will transmit a signal indicative of the character "Q". Accordingly, the first mode-altering key 506 may be utilized in connection with an uppercase alphabetic character, for example. Similarly, selected actuations of the second mode-altering key in combination with the character input key 504q will induce the character input portion 500 to transmit a signal indicative of the numeric character "1". Accordingly, the mode-altering keys 506 and 508 may be utilized in combination with the character input key 504q to form characters that include "q", "Q", and "1", which correspond with the character identifiers 540 that are printed on the character input key 504q.

The character input key 504a may be utilized in combination with previous actuations of mode-altering keys 506, 508, and 510 to input characters that include "a", "A", "/", and "\". More specifically, merely activating the character input key 504a inputs the character "a". In combination with the first mode-altering key 506, activating the character input key 504a inputs the character "A". Furthermore, activating one of mode altering keys 508 and 510 inputs the character "/" or the character "\", respectively. The mode-altering keys 506, 508, and 510 may be utilized, therefore, to modify the signal that is transmitted to the game console 102, or modify the manner in which the game console 102 processes the signal. Additional details concerning the manner in which the mode-altering keys 506, 508, and 510 are utilized to input characters will be described in greater detail below.

The various keys 512-522 may be utilized in a manner that is consistent with a conventional keyboard. Accordingly, the backspace key 512 may be utilized to erase a character that is behind a cursor, the space key 514 may be utilized to form a space between two characters, the enter key 516 may be utilized to affirmatively enter various characters, and the delete key 518 may be utilized to delete a character that is in front of the cursor, for example. The escape key 520 may be utilized for exiting various graphical user interfaces, and the various arrow keys 522 may be utilized to move the cursor in a direction that is consistent with indicia having the shape of an arrow and printed thereon. Accordingly, the keys 512-522 may have a use that is similar to corresponding keys on a keyboard or other input device. Within the scope of the present invention, however, alternate uses may be associated with the various keys 512-522.

The character input portion 500 also includes six modifiable keys 524 that each bear one of the following indicia: M1, M2, M3, M4, M5, and M6. The functions associated with each of the modifiable keys 524 may be modified by the user. For example, the user may set each of the modifiable keys 524 such that a specific single character or series of characters are input when activated. Alternatively, the modifiable keys 524 may be used to enter the signal of one of the mode-altering keys 506, 508, and 510. The modifiable keys 524 may also have functions that vary depending upon the specific software application that is being utilized in connection with the character input portion 500.

Based upon the above discussion, the character input portion 500 has a structure that mechanically and electrically interfaces with the game controller portion 400 and may, therefore, be detachably-secured to the game controller portion 400. The character input portion 500 includes a plurality of character input keys 504 that are associated with a plurality of characters. By activating the character input keys 504, signals indicative of various characters may be transmitted to the game console 102, thereby inputting characters. By also activating one of the mode-altering keys 506, 508, and 510, signals indicative of other various characters may be transmitted to the game console 102.

As discussed relative to the embodiments above, the specific signal transmitted to the game console 102 may be modified through use of the mode-altering keys 506, 508, and 510. Alternately, the mode-altering keys 506, 508, and 510 may be utilized to modify the manner in which the game console 102 processes the signal. For example, if a first signal is transmitted to the game console 102 in response to the activation of the first mode-altering key 506, then the game console 102 may process a second signal from the character input key 504q as being associated with the character "Q". Accordingly, processes for modifying the signal to the game console 102 may be positioned within the character input portion 500, or the manner in which the game console 102 processes the signal may be based upon the receipt of prior signals.

While the depicted exemplary embodiment of character input portion 500 includes a housing 502 separate from the housing 402 of the game controller portion 400, and further provides for non-destructible removable mechanical coupling and direct electrical coupling to the game controller portion 400, in another exemplary embodiment, character input portion 500 and game controller portion 400 are integrated within a common housing and the character input portion 500 and the game controller portion 400 preferably share common elements. Further, in another embodiment, character input portion 500 may be designed to coordinate directly with the game console unit 102 and need not be mechanically or directly electrically coupled to a game controller. In yet other additional embodiments, the character input portion 500 need not interface with game controller type devices and can interface with other types of devices, such as for email retrieval and transmission.

Procedures for Utilizing the Mode-Altering Keys

The mode-altering keys 506, 508, and 510 are generally utilized in combination with the character input keys 504 to input a variety of characters in accordance with the lookup table of FIG. 8. As discussed above, the character input key 504a may be utilized individually to input the lowercase character "a". The character input key 504a may also be utilized in combination with the first mode-altering key 506 to input the uppercase character "A". Similarly, the character input key 504a may be utilized in combination with the second mode-altering key 508 and the third mode-altering key 510 to input "/" and "\", respectively. The specific manner in which the mode-altering keys 506, 508, and 510 are utilized will be discussed in the following material.

Each of the character input keys 504 may be configured to input four different characters when utilized in combination with the mode-altering keys 506, 508, and 510. For each of the character input keys 504, the four different characters will be referred to herein as primary characters, secondary characters, tertiary characters, and quaternary characters. The primary characters are input when the system is in a DEFAULT mode. This DEFAULT mode can be considered to be a first mode. The character set associated with the DEFAULT mode is shown in column 804 of FIG. 8. The secondary characters are input when the system is in a second mode. The character set associated with the second mode is shown in column 806 of FIG. 8. The tertiary characters are input when the system is in a third mode. The character set associated with the third mode is shown in column 808 of FIG. 8. The quaternary characters are input when the system is in a fourth mode. The character set associated with the fourth mode is shown in column 810 of FIG. 8. As shown in FIG. 8, upon activating one of the character input keys 504 (shown in column 802), a signal will be input that corresponds to the specific character on the respective line of that character key and located in the column 804, 806, 808, or 810 of the specific mode that the system is currently in. With reference to the character input key 504a, for example, the primary character is the lowercase character "a", the secondary character is the uppercase character "A", the tertiary character is "/", and the quaternary character is "\".

Although each of the character input keys 504 may be configured to input primary, secondary, tertiary, and quaternary characters, some of the character input keys 504 may only be associated with primary, secondary, and tertiary characters, or some of the character input keys 504 may only be associated with primary and secondary characters. With reference to the character input key 504q, for example, the primary character is the lowercase character "q", the secondary character is the uppercase character "Q", the tertiary character is the numeric character "1", and no quaternary character is defined. Accordingly, some of the character input keys 504 may be capable of inputting greater or lesser numbers of characters when utilized in combination with the mode-altering keys 506, 508, and 510.

The mode-altering keys 506, 508, and 510 are generally associated with the second, third and fourth modes, respectively, and are used to change the mode of the system to that respective associate mode or back to the DEFAULT mode. As discussed above, the mode-altering keys 506, 508, and 510 may be color-coded to correspond with the various character identifiers 540. For example, the "shift" indicia on the first mode-altering key 506 may have a black color that corresponds with the various alphabetic character identifiers 540 on many of the character input keys 504. The circular indicia on the second mode-altering key 508 may have a blue color that corresponds with the various character identifiers 540 on many of the character input keys 504 and forward of other character identifiers 540. Similarly, the third mode-altering key 510 may have a green color that corresponds with the various character identifiers 540 located on the housing 502 and adjacent to some of the character input keys 504. The following discussion will refer to these relationships between the mode-altering keys 506, 508, and 510 and the various character identifiers 540 based upon the associated colors black, blue, and green. Accordingly, for ease of explanation purposes only, portions of the following description will refer to the DEFAULT mode (as the first mode), the BLACK mode (as the second mode), the BLUE mode (as the third mode), and the GREEN mode (as the fourth mode).

To provide various advantages relative to placing the system into a desired one of the different modes, an exemplary arrangement of the invention utilizes a base mode and temporary mode value. The base mode includes the same full set of possible mode values as described above (e.g., DEFAULT, BLACK, BLUE, and GREEN). The possible temporary mode values include the same possible mode values as the base mode except that there is no temporary DEFAULT mode value and the temporary mode can be set to NONE. The temporary mode overrides or takes precedence over the base mode unless the temporary mode is set to NONE, meaning that the temporary mode has effectively been turned off. Thus, when the temporary mode is BLACK, BLUE, or GREEN, the system utilizes the temporary mode as the mode to be used in the lookup table 800 in ascertaining the character to be input after the activation of one of the character input keys 504. When the temporary mode is NONE, the system utilizes the base mode as the mode to be used in the lookup table in ascertaining the character to be input after the activation of one of the character input keys 504.

Generally, the base mode is changed from one base mode to a second, third, or fourth mode (BLACK, BLUE, or GREEN) in response to two consecutive actuations of a respective mode-altering key 506, 508, or 510. As used herein, "consecutive or successive actuations" means two successive distinct actuations (such as completely actuating a first key then completely actuating a second key) and not simultaneous actuations (such as holding down a first key and pressing down a second key while the first key is being held in a depressed state).

For example, assume that the base mode is DEFAULT, and the user activates the first mode-altering key 506 twice. Such action changes the base mode from DEFAULT to BLACK. In this state, if the user then activates the character input key 504a, then the uppercase alphabetic character "A" will be input and the character input portion 500 will remain in the black base mode. Similarly, if the user subsequently depresses the character input key 504q, then the uppercase alphabetic character "Q" will be input. Also, if the user subsequently activates a series of character input keys 504, then a series of secondary characters will be input. Accordingly, the character input portion 500 will input a series of secondary characters when set to the black base mode. Similarly, if the user twice consecutively activates mode-altering key 508 or mode-altering key 510, the base mode is respectively changed to BLUE or GREEN, and the tertiary character set or the quaternary character set will be input as long as the temporary mode is NONE.

If the base mode is BLACK, BLUE, or GREEN and the mode-altering key 506, 508, or 510 of that color is actuated, the base mode is changed to DEFAULT. For example, if the base mode is BLACK and the user wishes to enter a primary character, such as the lowercase alphabetic character "a", the user can change the base mode to DEFAULT by once activating the first mode-altering key 506. Subsequent activations of the character input keys 504 will input, therefore, a series of primary characters until one of the mode-altering keys 506, 508, or 510 is activated.

Generally, the temporary mode is set in response to a single actuation of a mode-altering key 506, 508, or 510 that differs from the current base mode a single time. For example, if the base mode is DEFAULT, and the temporary mode is NONE, a single activation of mode-altering key 506 changes the temporary mode from NONE to BLACK.

The temporary mode is intended to control the character set of the immediately subsequent character input key 504 that is activated. Following the activation of that character input key 504 and the input of the applicable character from lookup chart 800, the temporary mode is reset to NONE. With the temporary mode set to NONE, subsequent character key entries will be in accordance with the character dictated by the base mode.

For example, assume that the character input portion 500 is set to be in the DEFAULT base mode and that the temporary mode is NONE. Upon an actuation of mode-altering key 506, the temporary mode is set to BLACK. This will place the applicable character set for the next character key pressed to be the character in column 806. In this state, if the user activates the character input key 504a, then the uppercase alphabetic character "A" will be input and the character input portion 500 will return to the temporary mode of NONE without disturbing the base mode. As the base mode was previously set to DEFAULT, if the user now activates the character input key 504a again, the lowercase alphabetic character "a" will be input. By once activating the first mode-altering key 506, therefore, a secondary character is input for only the single next character key activation, and all further activations will input a primary character. Accordingly, the character input portion 500 will input only one secondary character when set to the black temporary mode.

Similar concepts apply to the second mode-altering key 508 and the third mode-altering key 510. For example, by once activating the second mode-altering key 508, the character input portion 500 may be set to the BLUE temporary mode and a tertiary character will be input for only one subsequent activation of a character input key 504 based on the set of characters in column 808. For example, activating the character input key 504a will input a "/". By twice activating the second mode-altering key 508, the character input portion 500 may be set to the BLUE base mode and tertiary characters will be input for all subsequent activations of a character input key 504 until a mode-altering keys 506, 508, or 510 is subsequently activated.

The third mode-altering key 510 operates in a corresponding manner. By once activating the third mode-altering key 510, the character input portion 500 may be set to the GREEN temporary mode and a quaternary character will be input for only one subsequent activation of a character input key 504 based on the set of characters in column 810. For example, activating the character input key 504a will input a "\". By twice activating the third mode-altering key 510, the character input portion 500 may be set to the GREEN base mode and quaternary characters will be input for all subsequent activations of a character input key 504 until one of mode-altering keys 506, 508, or 510 is subsequently activated.

Figure 7:
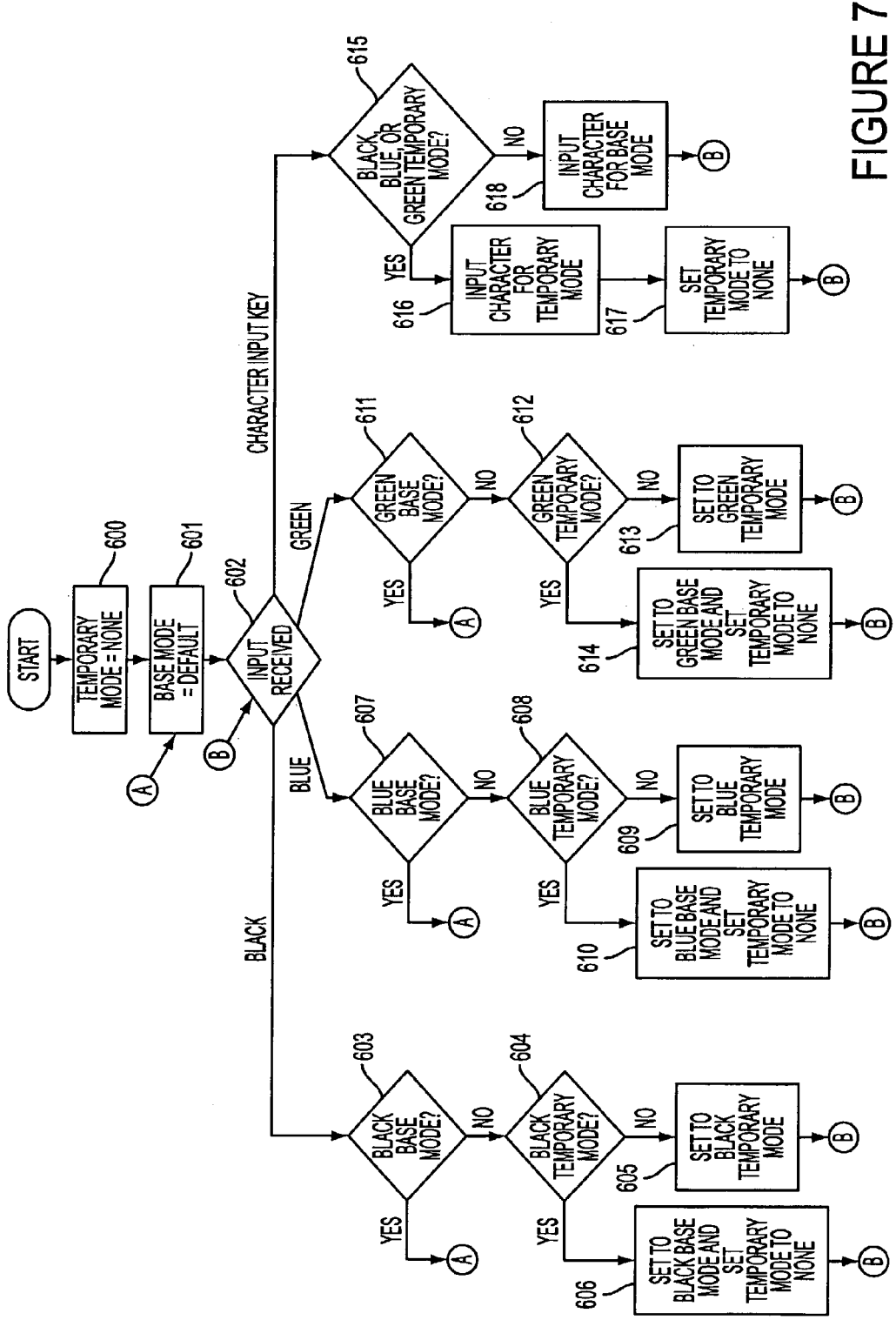
FIG. 7 is a flow diagram relating to mode-altering key states.

The above discussion is intended to provide a few specific examples of the manner in which the base mode and the temporary mode may be modified with the various mode-altering keys 506, 508, and 510, thereby resulting in various characters being input. With reference to FIG. 7, more detailed concepts regarding the operation of the various mode-altering keys 506, 508, and 510 and the interactions between the base mode and the temporary mode will be discussed.

The temporary mode of the character input portion 500 is initially is set to NONE (step 600) and the base mode is initially set to the DEFAULT (step 601). Input is then received by a microprocessor or controller within the character input portion 500, the game console 102, or a combination of both (step 602). The input may be the result of activating the first mode-altering key 506, the second mode-altering key 508, the third mode-altering key 510, or a character input key 504. In the following discussion of FIG. 7, input relating to the mode-altering keys 506, 508, and 510 will be respectively referred to as black, blue, and green input.

If the input received in step 602 is a black input (e.g., the user activates the first mode-altering key 506), the possible change in the state of the base mode and/or the temporary mode depends upon the state of the base mode and the temporary mode prior to the receipt of the input. Accordingly, the first determination to be made is whether the character input portion 500 is in the BLACK base mode (step 603). Initially, as described above, the character input portion 500 is in the DEFAULT base mode and the temporary mode is NONE. Accordingly, the character input portion 500 is not in the BLACK base mode upon the receipt of the black input in step 602. The second determination to be made is whether the character input portion 500 is in the BLACK temporary mode (step 604). Again, the character input portion 500 is initially has the temporary mode of NONE. Accordingly, the character input portion 500 is not in the BLACK temporary mode upon the receipt of input in step 602. The character input portion 500 is then set to the BLACK temporary mode (step 605). That is, the character input portion 500 is set to the BLACK temporary mode upon receipt of black input, and the base mode remains at DEFAULT.

Following step 605, the flow diagram of FIG. 7 returns to step 602, in which a subsequent key input is received. At this stage, the user may activate the first mode-altering key 506, the second mode-altering key 508, the third mode-altering key 510, or a character input key 504. Assume the user opts to provide a black input by activating the first mode-altering key 506 again. The first determination to be made is whether the character input portion 500 is in the black base mode (step 603). At this stage, the character input portion 500 is in the DEFAULT base mode and the temporary mode is BLACK. Accordingly, the character input portion 500 is not in the BLACK base mode upon the receipt of input in step 602 during this cycle. The second determination is whether the character input portion 500 is in the BLACK temporary mode (step 604). In this situation, the character input portion 500 is in the BLACK temporary mode. Accordingly, the character input portion 500 is then set to the BLACK base mode and the temporary mode is set to NONE (step 606). That is, the character input portion 500 is set to the BLACK base mode and the temporary mode is set to NONE upon receipt of black input twice.

Following step 606, the flow diagram of FIG. 7 returns to step 602, in which input is received. At this stage, the user again has the option of activating the first mode-altering key 506, the second mode-altering key 508, the third mode-altering key 510, or a character input key 504. Assume the user opts to provide a black input for a third time by activating the first mode-altering key 506. The first determination to be made is whether the character input portion 500 is in the BLACK base mode (step 603). At this stage, the character input portion 500 is in the BLACK base mode, and the flow diagram of FIG. 7 returns to step 601, wherein the character input portion 500 is returned to the DEFAULT base mode (the temporary mode remains at NONE). Accordingly, thrice activating the first mode-altering key 506 returns the character input portion 500 to the DEFAULT base mode with a temporary mode of NONE.

Based upon the above discussion, the character input portion 500 initially begins in the DEFAULT base mode and a temporary mode of NONE. Upon providing black input once (e.g., once activating the first mode-altering key 506), the character input portion 500 is set to BLACK temporary mode with the DEFAULT base mode remaining unchanged. Upon providing black input for a second time (e.g., twice activating the first mode-altering key 506), the character input portion 500 is set to the BLACK base mode and the temporary mode is returned back to NONE. Upon providing a black input for a third time (e.g., thrice activating the first mode-altering key 506), the character input portion 500 is returned to the DEFAULT base mode and the temporary mode remains NONE.

From the initial state, activating the blue input (e.g., the user activates the second mode-altering key 508), or the green input (e.g., the user activates the third mode-altering key 510) causes the same type of responses as with the black input as described above except for the resultant changes be made relative to the modes being set to BLUE or GREEN respectively instead of BLACK. Thus, for example, from step 602, if the user activates the blue input, a determination would be made at step 607 as to whether the system is in the BLUE base mode. As the base mode would be DEFAULT, a determination would then be made at step 608 as to whether the temporary mode is BLUE. Since the temporary mode is NONE, the temporary mode would be set to BLUE at step 609, and the system would await another input at step 602. If the user opts to provide a blue input for a second consecutive time by activating the second mode-altering key 508, a determination would be made at step 607 as to whether the system is in the BLUE base mode. As the base mode would be DEFAULT, a determination would be made at step 608 as to whether the temporary mode is BLUE. Since the temporary mode is BLUE, the base mode would be set to BLUE and the temporary mode would be returned to NONE at step 610. With the process returning step 602, the user again has the option of activating the first mode-altering key 506, the second mode-altering key 508, the third mode-altering key 510, or a character input key 504. Assume the user opts to provide a blue input for a third consecutive time by activating the second mode-altering key 508, a determination would be made at step 607 as to whether the system is in the BLUE base mode. As the base mode is BLUE, the base mode is reset to DEFAULT at step 601 and the system awaits an input at step 602.

Similarly, for example, from step 602, if the user activates the green input, a determination would be made at step 611 as to whether the system is in the GREEN base mode. As the base mode would be DEFAULT, a determination would then be made at step 612 as to whether the temporary mode is GREEN. Since the temporary mode is NONE, the temporary mode would be set to GREEN at step 613, and the system would await another input at step 602. If the user opts to provide a green input for a second consecutive time by activating the second mode-altering key 510, a determination would be made at step 611 as to whether the system is in the GREEN base mode. As the base mode would be DEFAULT, a determination would be made at step 612 as to whether the temporary mode is GREEN. Since the temporary mode is GREEN, the base mode would be set to GREEN and the temporary mode would be returned to NONE at step 614. With the process returning step 602, the user again has the option of activating the first mode-altering key 506, the second mode-altering key 508, the third mode-altering key 510, or a character input key 504. Assume the user opts to provide a green input for a third consecutive time by activating the second mode-altering key 510, a determination would be made at step 611 as to whether the system is in the GREEN base mode. As the base mode is GREEN, the base mode is reset to DEFAULT at step 601 and the system awaits in input at step 602.

The mode-altering keys 506, 508, and 510 may also be utilized in combination. Assume that the user progresses through steps 602, 603, 604, and 606 such that the character input portion 500 is set to the BLACK base mode and the temporary mode is NONE. Assume further that the user then provides a blue input such that the process progresses through steps 602, 607, 608, and 609. At this stage the character input portion 500 will have a BLACK base mode and a BLUE temporary mode. Similarly, a GREEN base mode may be utilized in conjunction with a BLACK temporary mode, a BLUE base mode may be utilized in conjunction with a GREEN temporary mode, or a BLACK base mode may be utilized in conjunction with a GREEN temporary mode, for example.

Additionally, the temporary mode can be changed between modes prior to the activation of a character input key. For example, assume that the base mode is BLUE and the temporary mode is BLACK. Upon the activation of a green input, a determination a determination would be made at step 611 as to whether the system is in the GREEN base mode. As the base mode would be BLUE, a determination would then be made at step 612 as to whether the temporary mode is GREEN. Since the temporary mode is BLACK, the temporary mode would be set to GREEN at step 613, and the system would await another input at step 602. Other permutations of the mode changing process in FIG. 7 are followed regardless of the order of the mode-altering keys pressed.

The results of activating one or more of the character input keys 504 in each of the states achieved above will now be described. Assume the character input portion 500 is in the DEFAULT base mode and the temporary mode is NONE, as in steps 600 and 601, and then the user activates one of the character input keys 504 in step 602. The first determination is whether the character input portion 500 is in the BLACK, BLUE, or GREEN temporary mode (step 615). In this example, the character input portion 500 is not in the BLACK, BLUE, or GREEN temporary mode upon the receipt of input in step 602. A character is then input based upon the base mode (step 618) which is in this case the DEFAULT base mode. For example, as can be seen from FIG. 8, if the user activated the character input key 504a as the input is step 602, then the lowercase alphabetic character "a" is input. Accordingly, a primary character is input when a character input key 504 is activated when the character input portion 500 is set to the DEFAULT base mode and the temporary mode is NONE (i.e., not BLACK, BLUE, or GREEN). Following step 618, the flow diagram of FIG. 7 returns to step 602 and the character input portion 500 remains set to the DEFAULT base mode with the temporary mode being NONE.

The character input portion 500 may also be set to the DEFAULT base mode and the BLACK temporary mode in the manner discussed above (e.g., by once activating the first mode-altering key 506). The first determination is whether the character input portion 500 is in the BLACK, BLUE, or GREEN temporary mode (step 615). For purposes of this example, the character input portion 500 is set to the DEFAULT base mode and the BLACK temporary mode. Accordingly, the character input portion 500 is in the BLACK temporary mode upon the receipt of input in step 602. As the determination to step 613 is affirmative, a character is then input based upon the temporary mode (step 616) which is the BLACK temporary mode in this case. For example, if the user activated the character input key 504a as the input is step 602, then the uppercase alphabetic character "A" is input. Accordingly, a secondary character is input when one of the character input keys 504 is activated when the character input portion 500 is set to the DEFAULT base mode and the BLACK temporary mode. Following step 616, the character input portion 500 is set to the DEFAULT temporary mode (step 617) and the flow diagram of FIG. 7 returns to step 602, with the character input portion 500 being set to DEFAULT base mode and a temporary mode of NONE.

The character input portion 500 may also be set to the BLACK base mode and the temporary mode of NONE in the manner discussed above (e.g., by twice activating the first mode-altering key 506). Upon the activation of a character input key 504, the first determination is whether the character input portion 500 is in the BLACK, BLUE, or GREEN temporary mode (step 615). For purposes of this example, the character input portion 500 is set to the BLACK base mode and the temporary mode of NONE. Accordingly, the character input portion 500 is in the temporary mode of NONE upon the receipt of input in step 602 and the answer to the determination at step 615 is negative. A character is then input based upon the BLACK base mode (step 618). For example, if the user activated the character input key 504a as the input is step 602, then the uppercase alphabetic character "A" is input. Accordingly, a secondary character is input when one of the character input keys 504 is activated when the character input portion 500 is set to the BLACK base mode and the temporary mode of NONE. Following step 618, the flow diagram of FIG. 7 returns to step 602 and the character input portion 500 remains set to the BLACK base mode with the temporary mode being NONE.

A few additional considerations arise based upon the above discussion. When the character input portion 500 is set to the DEFAULT base mode and the temporary mode is NONE, activating one of the character input keys 504 inputs a primary character, which is generally a lowercase alphabetic character. Once the primary character is input, the state of the character input portion 500 remains the same such that subsequent activations of one or more of the character input keys 504 will also input corresponding primary characters. When the character input portion 500 is set to the DEFAULT base mode and the BLACK temporary mode, activating one of the character input keys 504 inputs a secondary character, which is generally an uppercase alphabetic character. Once the secondary character is input, the state of the character input, portion 500 changes to the DEFAULT base mode and the temporary mode is returned to NONE such that subsequent activations of one or more of the character input keys 504 will input corresponding primary characters. By once activating the first mode-altering key, therefore, a single uppercase alphabetic character may be input, with subsequent characters being lowercase. Furthermore, when the character input portion 500 is set to the BLACK base mode and the temporary mode is NONE, activating one of the character input keys 504 inputs a secondary character. Once the secondary character is input, the state of the character input portion 500 remains the same such that subsequent activations of one or more of the character input keys 504 will also input corresponding secondary characters. Accordingly, the first mode-altering key 506 may be utilized to input a series of primary characters, a single secondary character followed by a series of primary characters, or a series of secondary characters. In order to set the character input portion 500 to the DEFAULT base mode and the temporary mode to NONE when in the BLACK base mode, the user need merely activate the first mode-altering key 506 again.

The specific character that is input upon activating one or more of the character input keys 504 depends upon the specific state induced in the character input portion 500 by one or more activations of the second mode-altering key 508. As with the discussion above, the various steps 615-618 may be utilized to determine the specific character that is input. When the character input portion 500 is set to the DEFAULT base mode and the temporary mode is NONE, activating one of the character input keys 504 inputs a primary character, which is generally a lowercase alphabetic character. Once the primary character is input, the state of the character input portion 500 remains the same such that subsequent activations of one or more of the character input keys 504 will also input corresponding primary characters. When the character input portion 500 is set to the DEFAULT base mode and the BLUE temporary mode, activating one of the character input keys 504 inputs a tertiary character, which is generally a numeric character for the character input keys 504 positioned in the first row 534, and is a punctuation mark or other symbol for the character input keys 504 positioned in the second row 536 and third row 538. Once the tertiary character is input, the state of the character input portion 500 changes the temporary mode to NONE and the base mode remains at DEFAULT such that subsequent activations of one or more of the character input keys 504 will input corresponding primary characters. By once activating the second mode-altering key, therefore, a single tertiary character may be input, with subsequent characters being primary characters. Furthermore, when the character input portion 500 is set to the BLUE base mode and the temporary mode is NONE, activating one of the character input keys 504 inputs a tertiary character. Once the tertiary character is input, the state of the character input portion 500 remains the same such that subsequent activations of one or more of the character input keys 504 will also input corresponding tertiary characters. Accordingly, the second mode-altering key 508 may be utilized to input a single tertiary character followed by a series of primary characters, or a series of tertiary characters.

The specific character that is input upon activating one or more of the character input keys 504 may also depend upon the specific state induced in the character input portion 500 by one or more activations of the third mode-altering key 510. As with the discussion above, the various steps 615-618 may be utilized to determine the specific character that is input. When the character input portion 500 is set to the DEFAULT base mode and the temporary mode is NONE, activating one of the character input keys 504 inputs a primary character, which is generally a lowercase alphabetic character. Once the primary character is input, the state of the character input portion 500 remains the same such that subsequent activations of one or more of the character input keys 504 will also input corresponding primary characters. When the character input portion 500 is set to the DEFAULT base mode and the GREEN temporary mode, activating one of the character input keys 504 inputs a quaternary character, which is generally a symbol for the character input keys 504 positioned in the second row 536 and the first character input key 504 in the third row 538. Once the quaternary character is input, the state of the character input portion 500 changes the temporary mode to NONE and the base mode remains at DEFAULT such that subsequent activations of one or more of the character input keys 504 will input corresponding primary characters. By once activating the third mode-altering key 510, therefore, a single quaternary character may be input, with subsequent characters being primary characters. Furthermore, when the character input portion 500 is set to the GREEN base mode and the temporary mode is NONE, activating one of the character input keys 504 inputs a quaternary character. Once the quaternary character is input, the state of the character input portion 500 remains the same such that subsequent activations of one or more of the character input keys 504 will also input corresponding quaternary characters. Accordingly, the third mode-altering key 510 may be utilized to input a single quaternary character followed by a series of primary characters, or a series of quaternary characters.

Thus, as herein described, the first, second, third, and fourth modes of DEFAULT, BLACK, BLUE, and GREEN correspond to the primary, secondary, tertiary, and quaternary characters respectively shown in columns 804, 806, 808, and 810 of FIG. 8. Upon the activation of a specific character input key 504, a signal corresponding to a particular character from a set of possible characters will be transmitted in accordance with the process of FIG. 7 and the lookup table of FIG. 8. While only four mode have been described and depicted, it is recognized that five or more than five modes may be used, preferably with at least one additional mode-altering key for each additional mode.

In an alternative embodiment, not depicted, the DEFAULT mode includes a mode-altering key directly associated with it. According to such an embodiment, the process of changing between base modes would be the same for the DEFAULT mode as well. That is, the user would activate the mode-altering key for the DEFAULT mode twice in succession to change the base mode to DEFAULT. Additionally, the temporary mode would include the existing set of mode choices (e.g., NONE, BLACK, BLUE and GREEN) and a DEFAULT mode choice. Activating the mode-altering key for the DEFAULT mode a single time would set the temporary mode to DEFAULT.

The character input portion 500 or other portions of the gaming system 100 may provide visual queues as to the state of the character input portion 500. Referring to FIG. 5, an indicator 542 is depicted on the character input portion 500. The indicator 542 may be a plurality of light emitting diodes, for example, that indicate the state of the character input portion 500. For example, one-half of the indicator 542 may have a blue color to indicate that the character input portion 500 is in the BLUE temporary mode, and the indicator 542 may not be lit when the character input portion 500 is in the DEFAULT base mode and the temporary mode is NONE. Similarly, the entirety of the indicator 542 may have a green color to indicate that the character input portion 500 is in the GREEN base mode.

An indicator may also be rendered on a display screen having a graphical user interface. The indicator may include, for example, three circular regions that correspond with the first mode-altering key 506, the second mode-altering key 508, and the third mode-altering key 510. When the character input portion 500 is in the black temporary mode, one-half of the region corresponding with the first mode-altering key 506 may be colored black as an indication. Similarly, to indicate that the character input portion 500 is in the BLACK base mode, all of the region corresponding with the first mode-altering key 506 may be colored black. Similar considerations apply to the other regions for the various BLUE and GREEN base and temporary modes. In some circumstances, the character input portion 500 may be in a BLACK base mode and a BLUE temporary mode, for example. Accordingly, one-half of the region corresponding with the second mode-altering key 508 may be colored. In this manner, the user may gain a visual queue as to the state of the character input portion 500.

The above discussion provides an understanding of concepts related to one application for the present invention. Various modifications, however, may be made to the invention. For example, the character input portion 500 is disclosed as having three mode-altering keys 506, 508, and 510. The character input portion 500 may have only two mode-altering keys or a significantly greater number of mode-altering keys. The invention is also disclosed in the context of gaming system 100, but may be applied to any computer-related system where text input is utilized. For example, the mode-altering keys may be provided on a conventional keyboard, or on a cellular phone. One skilled in the relevant art will recognize, therefore, that the general concepts related to the mode-altering keys and the operation of the mode-altering keys may be applied to a plurality of other electronic implements.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An input device comprising:
a game controller portion and a character input portion, the game controller portion including a plurality of interaction mechanisms operated by a user to direct game play, the character input portion including a plurality of interaction mechanisms operated by the user to input various characters, the character input portion being detachably secured to the game controller portion for being utilized to input various characters during game play when coupled to the game controller portion and for being removable from the game controller portion when not utilized, the character input portion as secured to the game controller portion interfacing mechanically and electrically with the game controller portion and mechanically abutting the game controller portion, the character input portion comprising:
a housing that forms at least a portion of an outer surface of the character input portion;
a plurality of character input keys accessible from an exterior of the housing, at least a portion of said character input keys each being associated with four distinct characters based upon a current mode; and
first, second, and third mode-altering keys accessible from the exterior of the housing for changing the current mode and determining which of the four distinct characters are input,
the game controller portion comprising a main body and a pair of grips each extending from the main body in a generally common direction, the grips for grasping the game controller portion during use and defining a space therebetween, the game controller portion further comprising an electrical connector in the main body thereof generally adjacent the space defined by the pair of grips, the electrical connector being a memory unit slot configured to accept a memory unit to provide additional and portable memory storage for game play;

the character input portion when coupled to the game controller portion entirely residing between the pair of grips and within the space defined by the pair of grips, and being electrically coupled to the memory unit slot of the game controller portion in place of the memory unit, the character input portion as coupled to the game controller portion physically abutting the pair of grips and the main body of the game controller portion, the physically abutted pair of grips and main body of the game controller portion assisting in securing the coupled character input portion to the game controller portion.

2. The input device recited in claim 1, wherein the character input keys are physically depressible.

3. The input device recited in claim 1, wherein the first, second and third mode-altering keys are physically depressible.

4. The input device recited in claim 1, wherein the four distinct characters for each character input key includes a lowercase alphabetic letter, an uppercase alphabetic letter, and at least one of a numeral and a symbol.

5. The input device recited in claim 1, further comprising a controller configured to change the mode from a first mode to a second mode upon a single input of a mode-altering key for a single input of an immediately subsequent character input key entry, and to automatically change the mode back from the second mode to the first mode following the entry of the immediately subsequent character input key entry.

6. The input device recited in claim 5, wherein the controller is further configured to change the mode from a first mode to a second mode for a multiple consecutive inputs of a subsequent character input key entry upon a dual successive inputs of a mode-altering key.

7. The input device recited in claim 1, further comprising a controller configured to change the mode from a first mode to a second mode for a multiple consecutive inputs of a subsequent character input key entry upon a dual successive inputs of a mode-altering key.

8. The input device recited in claim 1, wherein the character input keys and the first, second and third mode-altering keys are physically depressible, and wherein the four distinct character inputs for each character input key includes a lowercase version and an uppercase version of an alphabetic letter, and at least one of a numeral and a symbol, and said character input keys each include indicia thereon corresponding to its respective alphabetic letter, and said text input device further comprising a controller configured to (a) change the mode from a first mode to a second mode upon a single input of a mode-altering key for a single input of an immediately subsequent character input key entry, and to automatically change the mode back from the second mode to the first mode following the entry of the immediately subsequent character input key entry, and (b) change the mode from a first mode to a second mode for a multiple consecutive inputs of a subsequent character input key entry upon a dual successive inputs of a mode-altering key.

9. The input device recited in claim 1, further comprising a coupled game controller including a thumbstick.

10. The input device recited in claim 9, wherein the coupled game controller further comprises a D-pad.

11. The input device of claim 1, wherein the character input portion is configured such that:

each character key of the portion of the plurality is associated with a primary character output when the character input portion is in the first mode, a secondary character output when the character input portion is in the second mode and associated with a press of the first mode-altering key, a tertiary character when the character input portion is in the second mode and associated with a press of the second mode-altering key and a quaternary character when the character input portion is in the second mode and associated with a press of the third mode-altering key, and for each of the mode-altering keys a single press of that mode-altering key when the character input portion is in the first mode places the character input portion in the second mode and associated with that mode-altering key for a single press of a character key of the portion of the plurality, two consecutive presses of that mode-altering key when the character input portion is in the first mode places the character input portion in the second mode and associated with that mode-altering key for a multiple consecutive presses of any of the character keys of the portion of the plurality, a single press of that mode-altering key when the character input portion is in the second mode and associated with another of the mode-altering keys places the character input portion in the second mode and associated with that mode altering key for a single press of a character key of the portion of the plurality, and two consecutive presses of that mode-altering key when the character input portion is in the second mode and associated with another of the mode altering keys places the character input portion in the second mode and associated with that mode-altering key for a multiple consecutive presses of any of the character keys of the portion of the plurality.

12. An input device comprising:

a game controller portion and a character input portion, the game controller portion including a plurality of interaction mechanisms operated by a user to direct game play, the character input portion including a plurality of interaction mechanisms operated by the user to input various characters, the character input portion being detachably secured to the game controller portion for being utilized to input various characters during game play when coupled to the game controller portion and for being removable from the game controller portion when not utilized, the character input portion as secured to the game controller portion interfacing mechanically and electrically with the game controller portion and mechanically abutting the game controller portion, the character input portion comprising:

a housing that forms at least a portion of an outer surface of said character input portion;

at least twenty-six character input keys accessible from an exterior of said housing, each of said twenty-six character input keys being associated with a different Roman alphabet character in both a lowercase form and an uppercase form, and at least a portion of said twenty-six character input keys each being associated with at least two characters that are is not a Roman alphabet character; and a first mode-altering key, a second mode-altering key, and a third mode-altering key each being accessible from said exterior of said housing, each being depressible once or twice to determine whether said lowercase form, said uppercase form, or said two characters that are is not a Roman alphabet character is input upon activation of one of said twenty-six character input keys, the game controller portion comprising a main body and a pair of grips each extending from the main body in a generally common direction, the grips for grasping the game controller portion during use and defining a space therebetween, the game controller portion further comprising an electrical connector in the main body thereof generally adjacent the space defined by the pair of grips, the electrical connector being a memory unit slot configured to accept a memory unit to provide additional and portable memory storage for game play;

the character input portion when coupled to the game controller portion entirely residing between the pair of grips and within the space defined by the pair of grips, and being electrically coupled to the memory unit slot of the game controller portion in place of the memory unit, the character input portion as coupled to the game controller portion physically abutting the pair of grips and the main body of the game controller portion, the physically abutted pair of grips and main body of the game controller portion assisting in securing the coupled character input portion to the game controller portion.

13. The input device recited in claim 12, wherein depressing one of the first, second, or third mode-altering keys once places the input device in a temporary mode, depressing one of the first, second, or third mode-altering keys twice places the input device in a base mode, and again depressing the same one of the first, second, or third mode-altering key returns the input device to a default mode.

14. The input device recited in claim 12, wherein said first mode-altering key modifies said input device from a default mode, wherein said lowercase form is input, to one of a temporary mode and a base mode, wherein said uppercase form is input.

15. The input device recited in claim 14, wherein said second mode-altering key modifies said input device from the default mode to one of another temporary mode and another base mode, wherein said character that is not a Roman alphabet character is input.

16. The input device recited in claim 12, further comprising a coupled game controller including a thumbstick.

17. The input device recited in claim 16, wherein the coupled game controller further comprises a D-pad.

18. A method for inputting a character via an input device, the method comprising steps of:

providing the input device comprising a game controller portion and a character input portion, the game controller portion including a plurality of interaction mechanisms operated by a user to direct game play, the character input portion including a plurality of interaction mechanisms operated by the user to input various characters, the character input portion having at least twenty-six character input keys a first mode-altering key, a second mode-altering key, and a third mode-altering key each of said twenty-six character input keys being associated with a different Roman alphabet character in both a lowercase form and an uppercase form;

activating a character input key while the character input portion is in a default mode to transmit a signal associated with a Roman alphabet character in said lowercase form;

activating the first mode-altering key to place the character input portion in a temporary mode, and then activating the character input key to transmit a signal associated with a Roman alphabet character in said uppercase form and to return the character input portion to the default mode;

activating the second mode-altering key to place the character input portion in a temporary mode, and then activating the character input key to transmit a signal associated with a first non-Roman alphabet character and to return the character input portion to the default mode; and activating the third mode-altering key to place the character input portion in a temporary mode, and then activating the character input key to transmit a signal associated with a second non-Roman alphabet character and to return the character input portion to the default mode, the character input portion being detachably securable to the game controller portion, the method further comprising:

securing the character input portion to the game controller portion, the character input portion as secured to the game controller portion interfacing mechanically and electrically with the game controller portion and mechanically abutting the game controller portion;

utilizing the secured character input portion to input various characters during game play; and removing the character input portion from the game controller portion when not utilized, the game controller portion comprising a main body and a pair of grips each extending from the main body in a generally common direction, the grips for grasping the game controller portion during use and defining a space therebetween, the game controller portion further comprising an electrical connector in the main body thereof generally adjacent the space defined by the pair of grips the electrical connector being a memory unit slot configured to accept a memory unit to provide additional and portable memory storage for game play, the method further comprising:

coupling the character input portion to the game controller portion so as to entirely reside between the pair of grips and within the space defined by the pair of grips, and so as to electrically couple the character input portion to the memory unit slot of the game controller portion, the character input portion as coupled to the game controller portion physically abutting the pair of grips and the main body of the game controller portion, the physically abutted pair of grips and main body of the game controller portion assisting in securing the coupled character input portion to the game controller portion.

19. The method recited in claim 18, wherein at least a portion of said twenty-six character input keys are each associated with at least one character that is not a Roman alphabet character.

20. The method recited in claim 18, wherein the step of activating the first series of the character input keys displays the series of primary characters on an output device.

* * * * *